(12) United States Patent  
Morioka et al.

(10) Patent No.: US 6,239,809 B1  
(45) Date of Patent: May 29, 2001

(54) IMAGE PROCESSING DEVICE, IMAGE PROCESSING METHOD, AND STORAGE MEDIUM FOR STORING IMAGE PROCESSING PROGRAMS

(75) Inventors: Seisuke Morioka; Keisuke Yasui, both of Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/079,361

(22) Filed: May 15, 1998

(30) Foreign Application Priority Data

Jun. 3, 1997 (JP) .................................................. 9-144812

(51) Int. Cl.$^7$ ................................................. G06T 15/00
(52) U.S. Cl. ........................................... 345/431; 345/441
(58) Field of Search .................................... 345/422, 426, 345/430, 431, 441

(56) References Cited

U.S. PATENT DOCUMENTS

| | | | |
|---|---|---|---|
| 4,885,703 | * 12/1989 | Deering | 345/422 |
| 4,945,500 | * 7/1990 | Deering | 345/422 |
| 5,170,468 | * 12/1992 | Shah et al. | 345/516 |
| 5,493,644 | * 2/1996 | Thayer et al. | 345/422 |
| 5,517,603 | * 5/1996 | Kelley et al. | 345/422 |
| 5,596,686 | * 1/1997 | Duluk | 345/422 |
| 5,684,939 | * 11/1997 | Foran et al. | 345/431 |
| 5,892,516 | * 4/1999 | Alexander | 345/431 |
| 5,982,384 | * 11/1999 | Prouty et al. | 345/441 |

* cited by examiner

Primary Examiner—Cliff N. Vo  
(74) Attorney, Agent, or Firm—Dickstein Shapiro Morin & Oshinsky LLP

(57) ABSTRACT

The present invention relates to an image processing device comprising a rendering processing section for generating color data for pixels which are to be displayed from polygon data including at least a polygon ID, positional co-ordinates data and parameters for generating color data attributed thereto. The image processing device includes a polygon buffer memory for storing color data for pixels in a flame. The rendering processing section includes a first processing section (242, 243, 244, 245) for generating Z values of pixels in respective polygons in the frame and for storing Z values for pixels to be displayed on the screen and the polygon ID corresponding thereto in a Z value buffer memory. The rendering processing section includes a second processing section (246, 247, 248) for generating color data from the parameters attributed to the polygon IDs stored in the Z buffer memory for each pixels in the frame and for storing the color data in the frame buffer memory.

30 Claims, 12 Drawing Sheets

POLYGON DATA

POLYGON ID0

VERTEX 00
- $(Sx, Sy)$, Z VALUE
- $(Tx, Ty)$
- $(Nx, Ny, Nz)$
- $\alpha$ VALUE

POLYGON ID1

VERTEX 10
- $(Sx, Sy)$, Z VALUE
- $(Tx, Ty)$
- $(Nx, Ny, Nz)$
- $\alpha$ VALUE

VERTEX 01
- $(Sx, Sy)$, Z VALUE
- $(Tx, Ty)$
- $(Nx, Ny, Nz)$
- $\alpha$ VALUE

VERTEX 11
- $(Sx, Sy)$, Z VALUE
- $(Tx, Ty)$
- $(Nx, Ny, Nz)$
- $\alpha$ VALUE

VERTEX 02
- $(Sx, Sy)$, Z VALUE
- $(Tx, Ty)$
- $(Nx, Ny, Nz)$
- $\alpha$ VALUE

VERTEX 12
- $(Sx, Sy)$, Z VALUE
- $(Tx, Ty)$
- $(Nx, Ny, Nz)$
- $\alpha$ VALUE

10, FRAME

IMAGE PROCESSING DEVICE, IMAGE PROCESSING METHOD, AND STORAGE MEDIUM FOR STORING IMAGE PROCESSING PROGRAMS

BACKGROUND OF THE INVENTION

1. Field of the Invention

The present invention relates to an image processing device based on a computer, and more particularly, to an image processing device whereby the process of generating colour data for frames comprising a plurality of polygons can be conducted efficiently in a short period of time, or this process can be conducted efficiently in a short period of time using a small hardware composition, and it relates to a method for same and a storage medium for storing image processing programs for same.

2. Description of the Related Art

Image processing technology based on computers is used in simulation devices and game devices. Normally, data for polygons to be drawn on a screen and colour data for each pixel in these polygons are determined from image data generated by the simulation or game sequence program, and this colour data is stored in a frame buffer memory corresponding to the screen pixels. An image is then displayed on a display device, such as a CRT, or the like, in accordance with the colour data in the frame buffer memory.

The process of determining the aforementioned polygon data is usually carried out by a geometry processing section, and the process of determining colour data for each pixel is generally conducted by a rendering processing section.

The polygon data produced by the geometry processing section generally comprises vertex data. The colour data for pixels in a polygon is determined by interpolation of the parameter values contained in the vertex data.

However, in some cases, a frame may contain a plurality of polygons which overlap with each other, and in this event, only the portions of polygons which are foremost in the screen are displayed, whilst the portions of polygons which are covered by another polygon are not displayed. Therefore, conventionally, a Z-value buffer memory corresponding to the pixels in each frame is provided, and when the colour data for a pixel is written into the frame buffer memory, the Z-value for that pixel is written into a region of the Z-value buffer memory corresponding to the pixel. The operation of deciding whether or not a pixel in a polygon processed subsequently is positioned in front of a pixel already written to the memory is carried out by comparing their respective Z values. Alternatively, as a further algorithm, the colour data may always be written to the frame buffer starting from the polygon which is rearmost in the frame. The Z-value described above means depth value indicating a depth in a screen. For the convenience, the depth value is referred to z-value here in after.

However, when a plurality of polygons overlap with each other, it may occur that, after colour data for a pixel positioned to the rear of the frame has been calculated and colour data for that pixel has been written to the frame buffer memory, colour data for a pixel in a different polygon, positioned in front of the aforementioned pixel, is calculated and this colour data is written to the same address in the frame buffer memory. Therefore, the rendering process for the pixel positioned to the rear, which has already been carried out, becomes completely purposeless, thus causing the efficiency of the rendering process to decline.

Furthermore, in a conventional method, the rendering process for a particular pixel in a particular polygon is conducted simultaneously with the interpolation of parameters in the vertex data and the interpolation of Z values. Therefore, the hardware composition for this section becomes very large. Consequently, if it is sought to process a plurality of these sections in parallel, the hardware will become colossal, which will be impractical. This is one factor which restricts improvements in the efficiency of rendering.

SUMMARY OF THE INVENTION

Therefore, it is an object of the present invention to provide an image processing device, method and storage medium for storing programs for same, whereby image processing using a computer can be conducted more efficiently.

It is a further object of the present invention to provide an image processing device, method and storage medium for storing programs for same, whereby, in image processing, rendering for generating colour data for pixels can be conducted more efficiently.

According to the present invention, the aforementioned objects are achieved by providing, in an image processing device comprising a rendering processing section for generating colour data for pixels which are to be displayed from polygon data including, at least, a polygon ID, positional co-ordinates data and parameters for generating colour data attributed thereto, the image processing device comprising: a polygon buffer memory for storing the polygon data; and a frame buffer memory for storing colour data for the pixels in a frame; wherein the rendering processing section comprises: a first processing section for generating Z values (depth values) indicating the depth in a screen of pixels in respective polygons, for a plurality of polygons located in the frame, and storing the Z values for pixels to be displayed on the screen and the polygon IDs corresponding thereto in a Z value buffer memory, in which the Z values for pixels in the frame are stored; and a second processing section for generating colour data from the parameters attributed to the polygon IDs stored in the Z value buffer memory, for each pixel in the frame; wherein the colour data for each pixel generated by the second processing section is stored in the frame buffer memory.

By means of this composition, firstly, the Z values for the pixels are determined for all polygons in a frame and the pixels that are to be displayed on the screen are determined according to their Z values, whereupon colour data can be generated for the pixels to be displayed in the frame. Therefore, it is possible to avoid wasteful generation of colour data for pixels in overlapping regions.

Furthermore, in the present invention, by providing a plurality of levels in the first processing section, Z values can be generated for a plurality of pixels in parallel. Furthermore, by providing a plurality of levels in the first processing section, Z values for pixels can be generated for a plurality of polygons in parallel.

According to the present invention, the aforementioned objects are also achieved by providing, in an image processing method comprising a rendering process step for generating colour data for pixels which are to be displayed from polygon data including, at the least, a polygon ID, positional co-ordinates data and parameters for generating colour data attributed thereto, wherein the rendering process step comprises: a first processing step for generating Z values (depth values) indicating the depth in a screen of pixels in respective polygons, for a plurality of polygons located in the frame, and storing the Z values for pixels to be displayed on the screen and the polygon IDs corresponding thereto in a Z value buffer memory, wherein the Z values for pixels in the frame are stored; and a second processing step for generating colour data from the parameters attributed to the polygon IDs stored in the Z value buffer memory, for each pixel in the frame, and storing the generated colour data for each pixel in the frame buffer memory.

According to the present invention, the aforementioned objects are also achieved by providing, in a computer-readable storage medium storing a program for causing a computer, which comprises, at least, a central processing device for performing calculations and a frame buffer memory for storing colour data for pixels in a frame, to execute an image processing routine comprising a rendering process whereby colour data for pixels which are to be displayed is generated from polygon data including, at the least, a polygon ID, positional co-ordinates data and parameters for generating colour data attributed thereto; wherein the programs comprise a program for causing a computer to execute: a first processing routine for generating Z values (depth values) indicating the depth in a screen of pixels in respective polygons, for a plurality of polygons located in a frame, and storing the Z values for pixels to be displayed on the screen and the polygon IDs corresponding thereto in a Z value buffer memory, in which the Z values for pixels in the frame are stored; and a second processing routine for generating colour data from the parameters attributed to the polygon IDS stored in the Z value buffer memory, for each pixel in the frame, and storing the generated colour data for each pixel in the frame buffer memory.

DESCRIPTION OF THE PREFERRED EMBODIMENTS

Below, embodiments of the present invention are described with reference to the drawings. However, the technical scope of the present invention is not limited to these embodiments.

Figure 1:
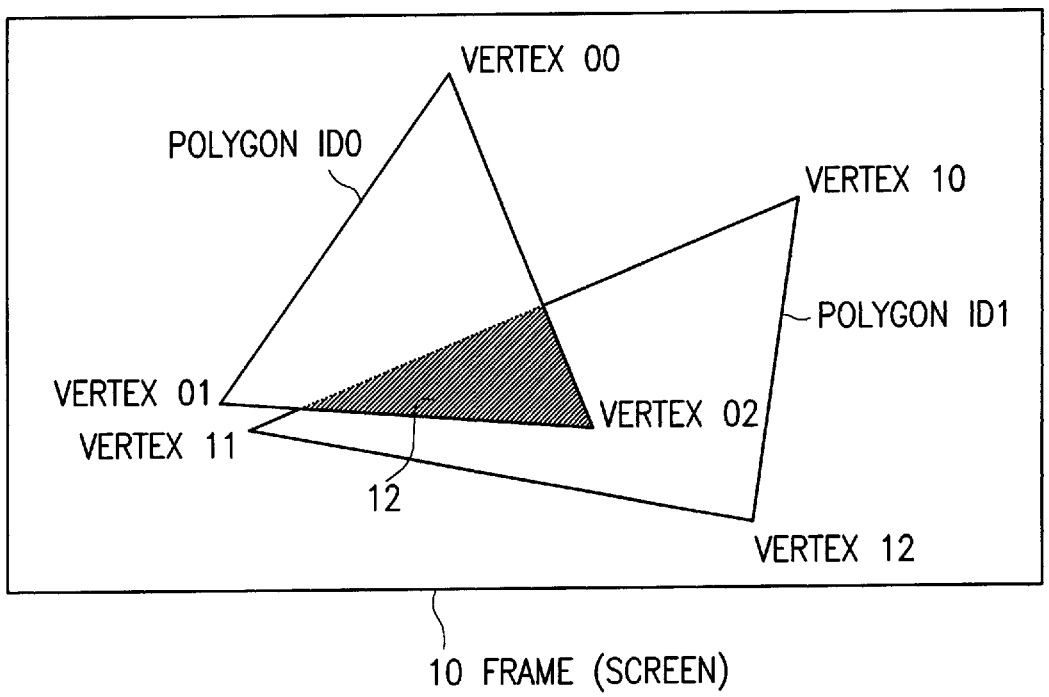
FIG. 1 is a diagram showing a case where two partially overlapping polygons ID0, ID1 are displayed in a frame 10.

FIG. 1 shows a case where two partially overlapping polygons ID0, ID1 are displayed in a frame (screen) 10. In this example, the polygon ID0 comprises vertices 00, 01, 02, and the polygon ID1 comprises vertices 10, 11, 12. In the frame, the polygon ID0 is positioned in front of the polygon ID1. Therefore, the two polygons overlap in the shaded region 12 in the diagram.

However, as described previously, in region 12 only the polygon ID0 which is in the foremost position is displayed, and the portion of ID1 positioned behind this is not displayed. Accordingly, if colour data for the pixels of the polygon ID1 located in region 12 is first calculated by interpolation and written to the frame buffer memory, these interpolation and memory writing operations will be purposeless. This is because the colour data for the pixels of polygon ID0 determined subsequently are written into the frame buffer memory 26 over this data. The polygon data generated by the geometry processing section from image data supplied by the computer is generally produced in a random order. Accordingly, there is a simple 50% probability that the data for the polygon ID1 will be generated and subjected to rendering processing first.

Figure 2:
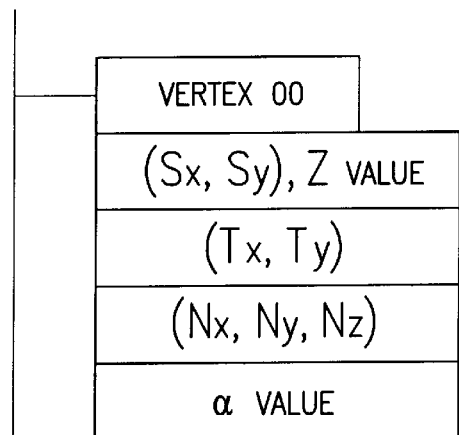
FIG. 2 is a diagram showing compositional examples of polygon data generated by a geometry processing section.
Figure 2:
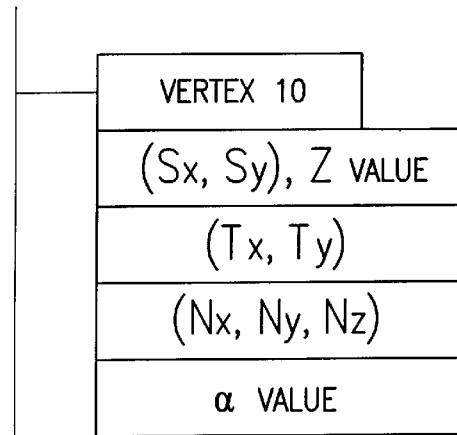
Figure 2:
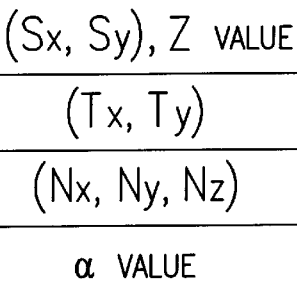
Figure 2:
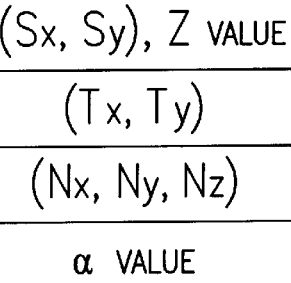
Figure 2:
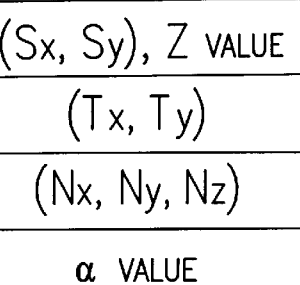
Figure 2:
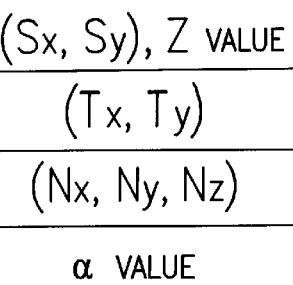

FIG. 2 shows examples of the composition of polygon data generated by the geometry processing section. In these examples, the polygon ID0 comprises vertices 00, 01, 02, and the data for these respective vertices contains a plurality of vertex parameters. In the examples in FIG. 2, these vertex parameters include: the screen co-ordinates (Sx, Sy) of the vertex on the screen and a Z value (depth value) indicating the depth of the vertex in the screen, texture coordinates (Tx, Ty) giving a storage address for texture data for thepolygon, normal linevectors (Nx, Ny, Nz), and an α-value (scalar value) indicating the transparency. These vertex parameters are supplied as attribute data for each vertex. Furthermore, for the polygon ID it is also possible to use the leading segment address in memories 201, 202 (described later in FIG. 4), when the data for each polygon is stored in these memories.

Figure 3A:
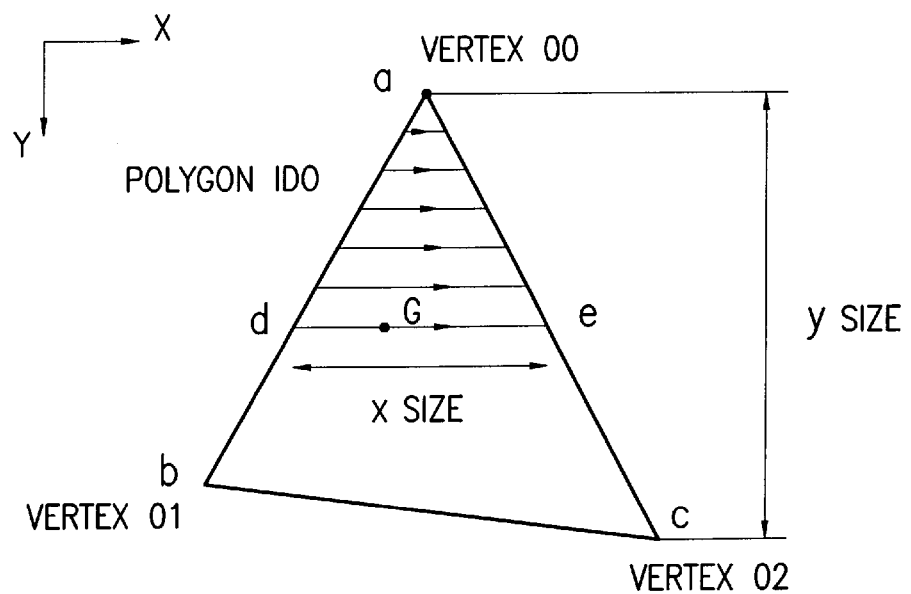
FIG. 3 shows diagrams for describing an example of determining parameters for a pixel in a polygon by interpolation using vertex parameters.

FIG. 3 is a diagram for describing one example of an operation of finding the parameters for each pixel in the polygon ID0 from the vertex parameters, by means of interpolation. As shown in FIG. 3A, X, Y co-ordinates are defined, and interpolation is conducted with respect to a pixel G in the polygon, starting from vertex 00 and preceding in the scanning direction indicated by the arrows. This scanning direction is simply an example, and scanning is not necessarily limited to parallel movement using X and Y axes, but rather, if scanning in a direction which is inclined by a desired angle, the scanning direction may be defined using an algorithm.

In the example shown in FIG. 3A, starting from vertex 00 and moving in the positive direction of the Y axis, the position of the pixel G moves in the positive direction of the X axis along a horizontal line between the left and right-hand edges, ab and ac, and then it shifts further in the positive direction of the Y axis and moves again along a horizontal line between the left and right-hand edges. In this example, vertex 02 is the end point.

Figure 3B:
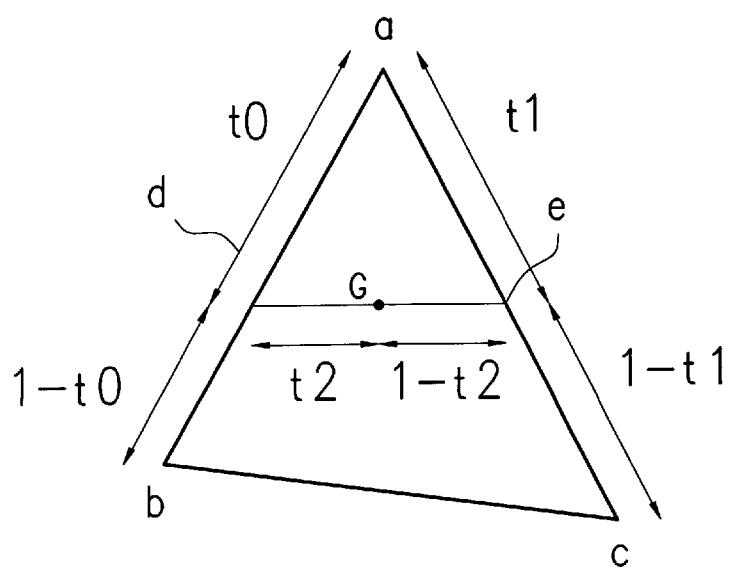

FIG. 3(B) shows the internal division ratios t0, t1, t2 used in interpolation processing. Now, parameters will be derived for pixel G. When determining the texture co-ordinates, which is one of the parameters, if the texture co-ordinates for vertices 00, 01, 02 are (Tx0, Ty0), (Tx1, Ty1), (Tx2, Ty2), then the texture co-ordinates (Txd, Tyd) for point d on edge ab will be $$Txd=Tx0 \cdot t0+Tx1 \cdot (1-t0)$$

$$Tyd=Ty0 \cdot t0+Ty1 \cdot (1-t0)$$

and similarly, the texture co-ordinates (Txe, Tye) for point e on edge ac will be $$Txe=Tx0 \cdot t1+Tx2 \cdot (1-t1)$$

$$Tye=Ty0 \cdot t1+Ty2 \cdot (1-t1).$$

Therefore, the texture co-ordinates (Txg, Tyg) for pixel G on the horizontal line de will be $$Txg=Txd \cdot t2+Txe \cdot (1-t2)$$

$$Tyg=Tyd \cdot t2+Tye \cdot (1-t2).$$

On the equation, the internal division ratio t0 is, $$t0=(xd-xb)/(xa-xb)$$

wherein xa, xb, xd are X co-ordinates for the vertices a, b and C.

The other vertex parameters, namely, screen co-ordinates and Z value, normal vectors, a value, and soon, are determined by similar interpolation processes. Each time the pixel G moves, the internal division ratios t0, t1, t2 are incremented. In this way, the calculation of pixel parameters by interpolation takes up a large amount of computer processing time.

Example of Image Processing Device

Figure 4:
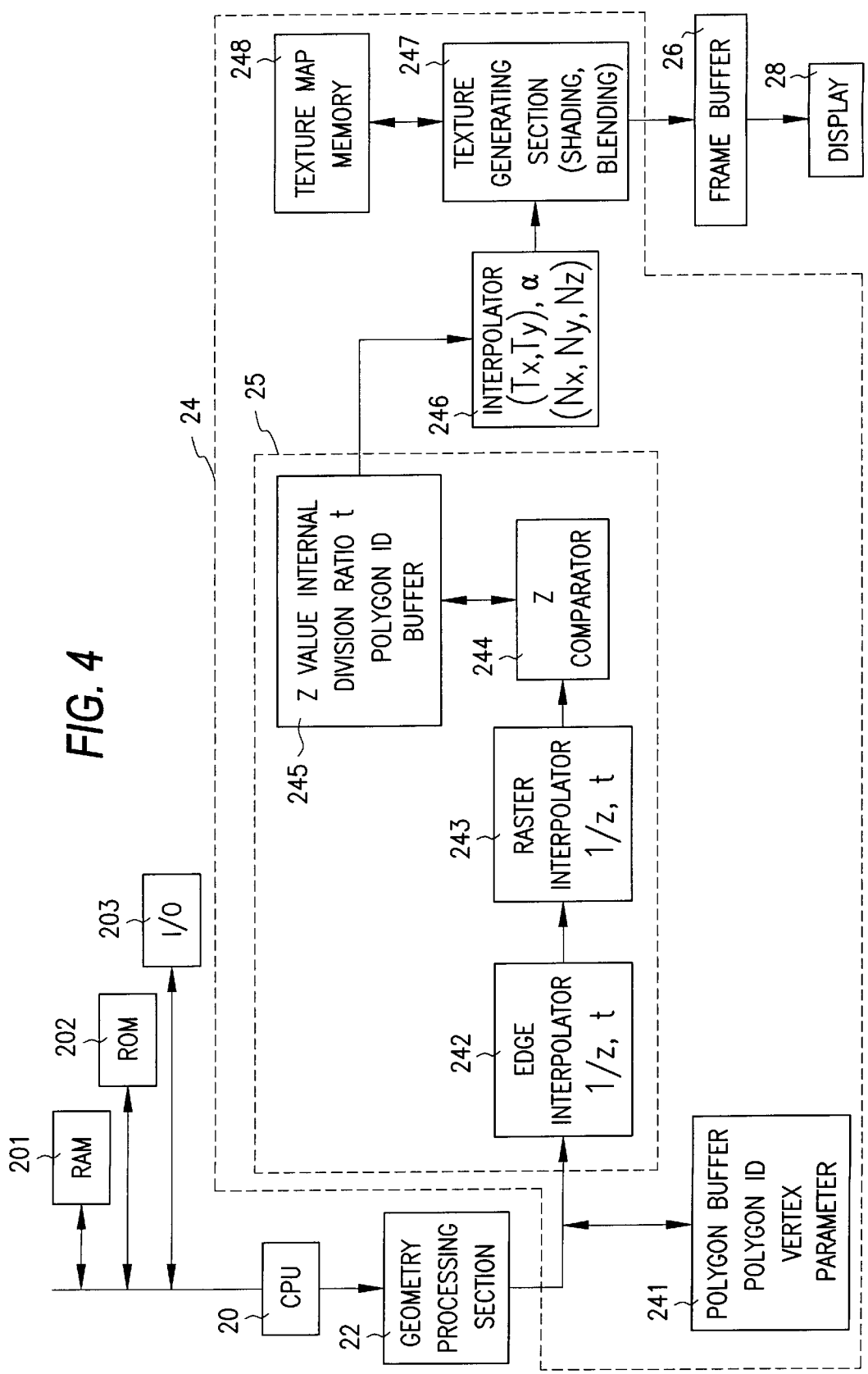
FIG. 4 is an approximate block diagram of an image processing device according to an embodiment of the present invention.

FIG. 4 is an approximate block diagram of an image processing device according to an embodiment of the present invention. This block diagram comprises: a CPU 20 forming a computer for generating image data by executing game sequence programs, or the like; a geometry processing section 22 for generating polygon data as illustrated in FIG. 2 by performing calculations, such as polygon lay-out conversion, and the like, in accordance with image data from the CPU 20, and a rendering section 24 for generating colour data for each pixel on the basis of this polygon data. 26 is a frame buffer memory for storing this colour data, and 28 is a display device for displaying this colour data.

In the computer, there are usually provided a RAM 201, ROM 202, and an input/output device I/O 203, which are connected to the CPU 20. The ROM 202 contains the aforementioned sequence programs, for example.

The geometry processing section 22 generally conducts the processes of: geometry conversion for altering the position of the polygons; clipping for sampling the polygons in the screen according to viewpoint data; and viewpoint conversion for determining two-dimensional screen co-ordinates from three-dimensional co-ordinates. Vertex position data in the form of screen co-ordinates (Sx, Sy) and a Z value (depth value) indicating the depth of the vertex in the screen is then supplied as one of the vertex parameters.

The rendering section 24 comprises: a polygon buffer memory 241 for storing the polygon data in FIG. 2; edge interpolator 242 for interpolating Z values for points d and e on the edges of the aforementioned polygon by means of the internal division ratios t0, t1; raster interpolator 243 for interpolating z values for pixel G on the horizontal line de; Z comparator 244; and a Z value buffer memory 245 for storing Z values, internal division ratios t0, t1, t2, and polygon IDs.

The edge interpolator 242, raster interpolator 243, Z value comparator 244 and Z value buffer memory 245 form a unit 25 for determining Z values for all the pixels in a polygon. The rendering section 24 comprises: an interpolator 246 for determining parameters for each pixel in a frame in accordance with the internal division ratios and polygon IDs stored in the Z value buffer memory 245, and a texture generating section 247 for determining colour data for each pixel on the basis of parameters determined by the aforementioned interpolator 246. 248 is a texture map memory which stores texture data.

The foregoing texture generating section 247 reads out texture data from the texture map memory 248 in accordance with the texture co-ordinates (Txg, Tyg) for the pixel as determined by interpolation processing, and it conducts a shading process using normal vectors (Nxg, Nyg, Nzg) and a colour blending process for semi-transparent pixels, using the transparency value, ag. The parameter interpolator 246 is also connected to the polygon buffer memory 241 and refers to the polygon data stored therein.

One characteristic feature of the composition of the image processing device described above is the fact that the edge interpolator 242 and raster interpolator 243 which interpolate Z values for the pixels are separate from the parameter interpolator 246. In other words, firstly, the Z values are determined by interpolation for all the polygons contained in a particular frame, Z comparator 244 compares the Z values, and the polygon ID attributed to the pixels positioned foremost in the screen is stored in the Z value buffer memory 245 along with the internal division ratios t0, t1, t2 for that polygon. Thereupon, the parameter interpolator 246 carries out parameter interpolation processing only for the pixels stored in the Z value buffer memory 245. Therefore, the texture generating section 247 only generates colour data for pixels which are to be displayed, and similarly only colour data for pixels which are to be displayed is written in the frame buffer 26. Consequently, it is possible to avoid generating colour data and writing this data to the frame buffer memory 26, for the region 12 of the polygon ID1 which is positioned rearmost, as illustrated in FIG. 1.

Image Processing Flow

Figure 5:
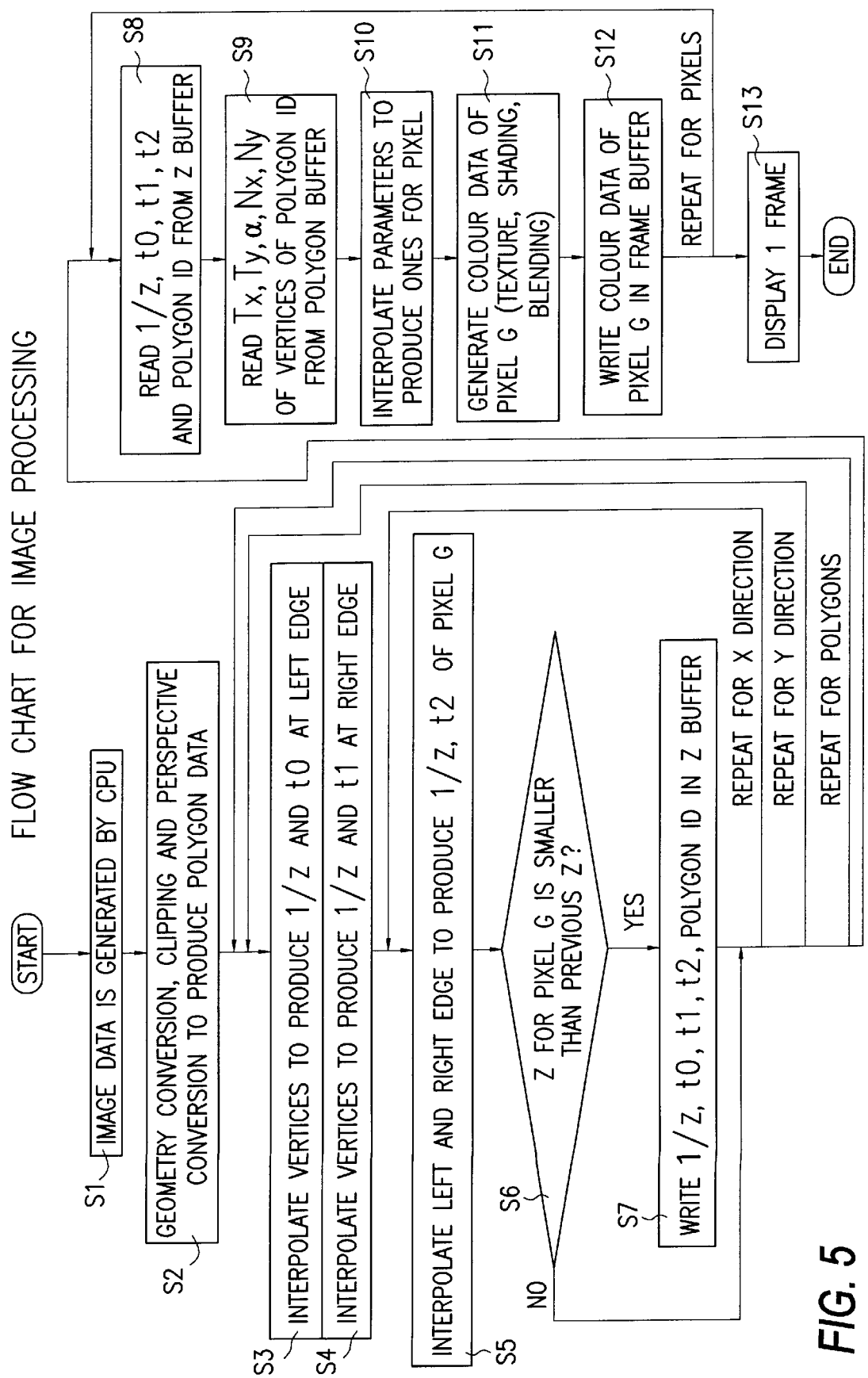
FIG. 5 is a flowchart diagram of image processing implemented by an image processing device.

FIG. 5 is a flowchart of image processing in the image processing device described above. An example of an image processing method is described in detail below with reference to FIG. 5 and the block diagram in FIG. 4.

Firstly, image data is generated by the CPU 20 (S1). This image data contains polygon movement data and viewpoint data. The geometry processing section 22 conducts the aforementioned geometry conversion, clipping and perspective conversion processes, and the like, to produce polygon data as illustrated in FIG. 2, which is stored in the polygon buffer memory 241 (S2). Polygon data are generated in a random order, for example, by the geometry processing section 22. Rendering is then implemented for all the polygon data in a single frame. Therefore, the polygon buffer memory 241 is provided for two frames' worth of data, so that whilst rendering is carried out for the polygons in one frame, the polygon data for the next frame can be stored in the other polygon buffer memory.

The Z value for a pixel in a particular polygon is interpolated on the basis of the Z values of the vertices in the corresponding polygon data stored in the polygon buffer memory 241. Firstly, the Z value of point d on the left-hand edge ab is found by interpolating the Z values of its vertices (S3). In this interpolation process, the internal division ratio t0 is used. The Z value for point e on the right-hand edge ac is determined in a similar manner (S4). In this interpolation process, the internal division ratio t1 is used. These interpolation operations are carried out in the edge interpolator 242. Thereupon, the Z value at pixel G is determined by raster interpolation based on the Z values at points d and e on either side thereof (S5). In this interpolation process, the internal division ratio t2 is used. FIGS. 4 and 5 show 1/z as an example of a Z value, and this is because it is convenient to use the reciprocal of the Z value when interpolating for perspective conversion and projection on the display screen.

The Z value comparator 244 compares the Z value for pixel G determined by steps S3, S4 and S5 above with a Z value already written to the Z value buffer memory 245, to determine whether or not the pixel is foremost in the screen (S6). If the pixel under processing is foremost (if its Z value is smaller, or its 1/z value is greater), then the Z value, polygon ID and internal division ratios t0, t1, t2 for the pixel under processing are written in the buffer memory 245 over the previous data. Accordingly, the Z value for the pixel which is foremost in the screen, and the corresponding polygon ID data and the internal division ratios t0, t1, t2 used in the interpolation processing for that pixel, are stored in the Z value buffer memory 245.

As illustrated in FIG. 5, steps S5, S6, S7 are repeated according to the size in the X direction of the horizontal line de illustrated in FIG. 3. When the raster scanning of the horizontal line de is completed, the horizontal line de is shifted in the positive direction of the Y axis, and steps S3, S4, S5, S6, S7 are implemented again for the new horizontal line. Therefore, the steps S3, S4, S5, S6, S7 are repeated according to the size of the polygon in the direction of the Y axis illustrated in FIG. 3. When the processes of Z value interpolation and writing to the buffer memory 245 are completed for the pixels in one polygon as described above, the steps S3, S4, S5, S6, S7 are executed for the next polygon. As illustrated in FIG. 5, Z values are interpolated for all the polygons in the frame, and the Z values for the pixels positioned foremost in the screen are stored in the Z value buffer memory 245 along with the corresponding ID data and internal division ratios.

In the aforementioned calculation processes, there may be purposeless Z value interpolation for pixels which are positioned to the rear of the screen. However, Z value interpolation can be carried out relatively simply, and this is unlikely to cause a major decline in the overall efficiently of image processing. Moreover, the internal division ratios for pixels determined in this Z value interpolation processing are stored in the buffer memory 245 and are used for interpolating the subsequent parameters.

Once the polygon ID data and internal division ratios for the pixels which are to be displayed on the display screen have been stored in the Z value buffer memory, colour data for the pixels is generated by the parameter interpolator 246 and texture interpolator 247. Firstly, the Z value, internal division ratios t0, t1, t2, and polygon ID data for a particular pixel are read out from the Z value buffer memory 245 by the parameter interpolator 246 (S8). The texture co-ordinates, a value, and normal vectors forming the vertex parameters for that polygon ID are then read out from the polygon buffer memory 241 (S9). Pixel parameters are interpolated from these vertex parameters using internal division ratios t0, t1, t2 (S10).

Colour data for the pixel is generated by the texture generating section 247 on the basis of the determined parameter values (S1). In specific terms, texture data in the texture map 248 is read out according to the texture co-ordinates (Txg, Tyg). Shading calculations are carried out with respect to the pixel colour data on the basis of the normal vectors (Nxg, Nyg, Nzg), thereby generating colour data which has undergone shading. When it is found from the a value that the pixel is a semi-transparent pixel, processing for blending this pixel with colour data for the pixel behind it is carried out.

The blending process does not relate directly to the characteristic features of the present invention, and therefore it is not described in detail here, but this process may be carried out by, for example, supplying data from the computer indicating whether the polygon is semi-transparent in the form of polygon attribute data, and conducting rendering processing for semi-transparent polygons after rendering non-transparent polygons.

The colour data for the pixel determined as described above is then written to the frame buffer memory 26 (S12).

The foregoing processing steps from S8 to S12 are repeated for each pixel in the buffer memory 245, 26. Since this processing is carried out only for the number of pixels which are to be displayed, it is possible to complete processing in a very short period of time. In particular, since the processing in the texture generating section 246 requires a relatively long time, the reduction in the number of pixels for processing in the texture generating section 246 contributes to the improvement in efficiency of the rendering process overall. Furthermore, since the internal division ratios for the pixels already determined in Z value interpolation are used again, the processing time is shortened in this respect also.

Example of Image Processing Device Based on Generic Computer

The image processing device illustrated in FIG. 4 shows an example where the geometry processing section 22 and rendering section 24 are constituted by special hardware. In this case, the image data is essentially converted in succession to polygon data, and pixel colour data by pipeline processing.

However, in the image processing method according to the present invention, it is possible for the geometry processing and rendering processing described above to be carried out by means of a software program using a generic computer. In this case, the image processing program uses program code to make the computer implement the processing steps of the flowchart in FIG. 5.

Figure 6:
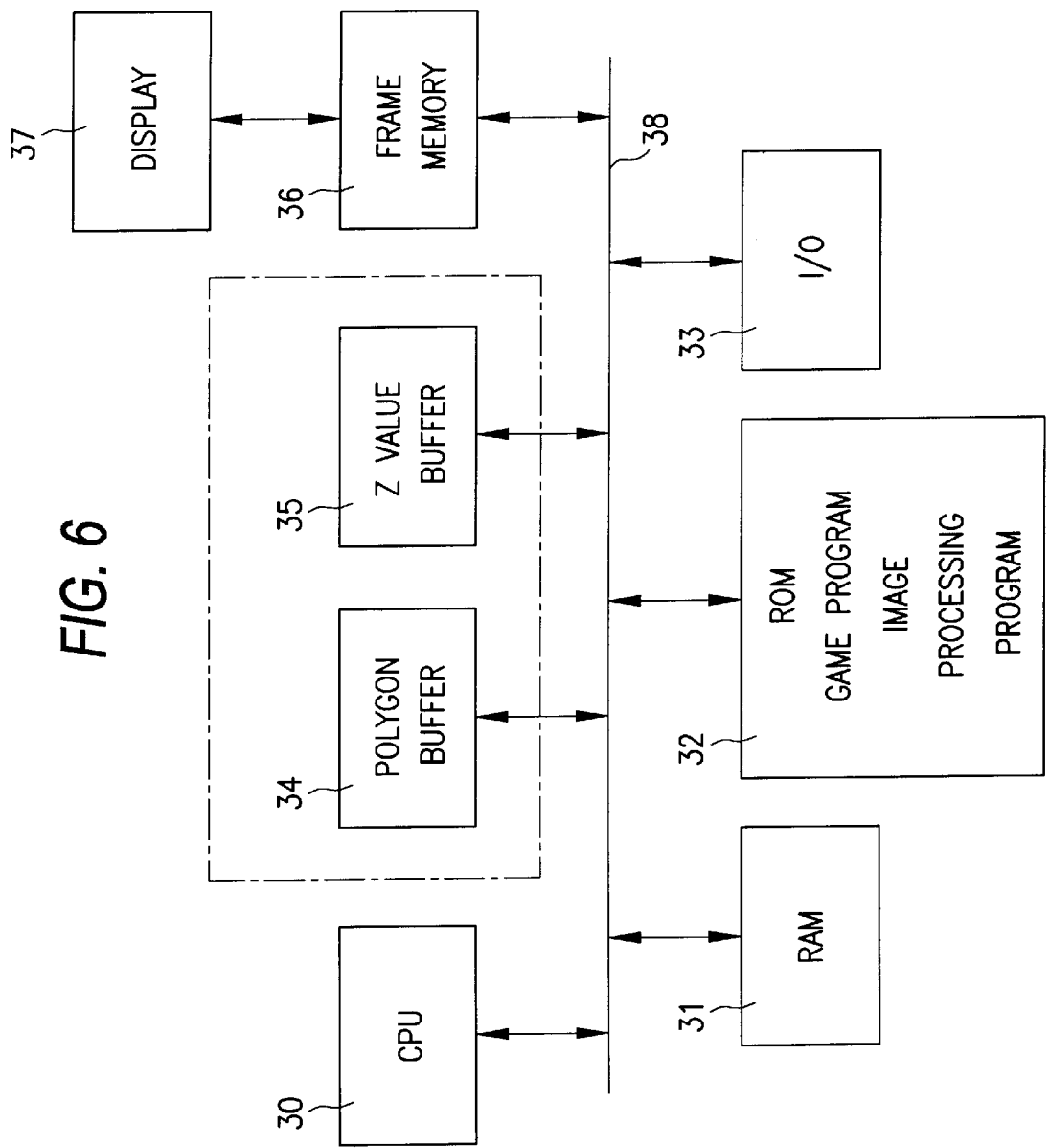
FIG. 6 is a compositional diagram of a computer in a case where the image processing method according to the present invention is implemented using a generic computer.

FIG. 6 is a compositional diagram of a computer in a case where the image processing method according to the present invention is implemented using a generic computer. In this example, a CPU 30, RAM 31, program memory 32, I/O device 33, polygon buffer memory 34, Z value buffer memory 35 and frame buffer memory 36 are connected via a common bus 38. An external display device 37 is connected to the frame buffer memory 36.

The program memory 33 comprises, for example, an electromagnetic medium such as a hard disk, or a storage medium which conducts writing and reading operations optomagnetically, CDROM, semiconductor memory, or the like. Game or simulation programs and image processing programs are stored in the program memory 32. The RAM 31 is used as a working memory for the various calculations executed by the CPU. Therefore, the polygon buffer memory 34 and Z value buffer memory 35 may be formed in a high-speed-access RAM. The image processing according to the present invention described above can be implemented using a generic computer, by means of program code for the image processing program stored in the program memory 32. Therefore, the program memory needs to be a computer-readable storage medium.

Further Modes of Implementation

Figure 7:
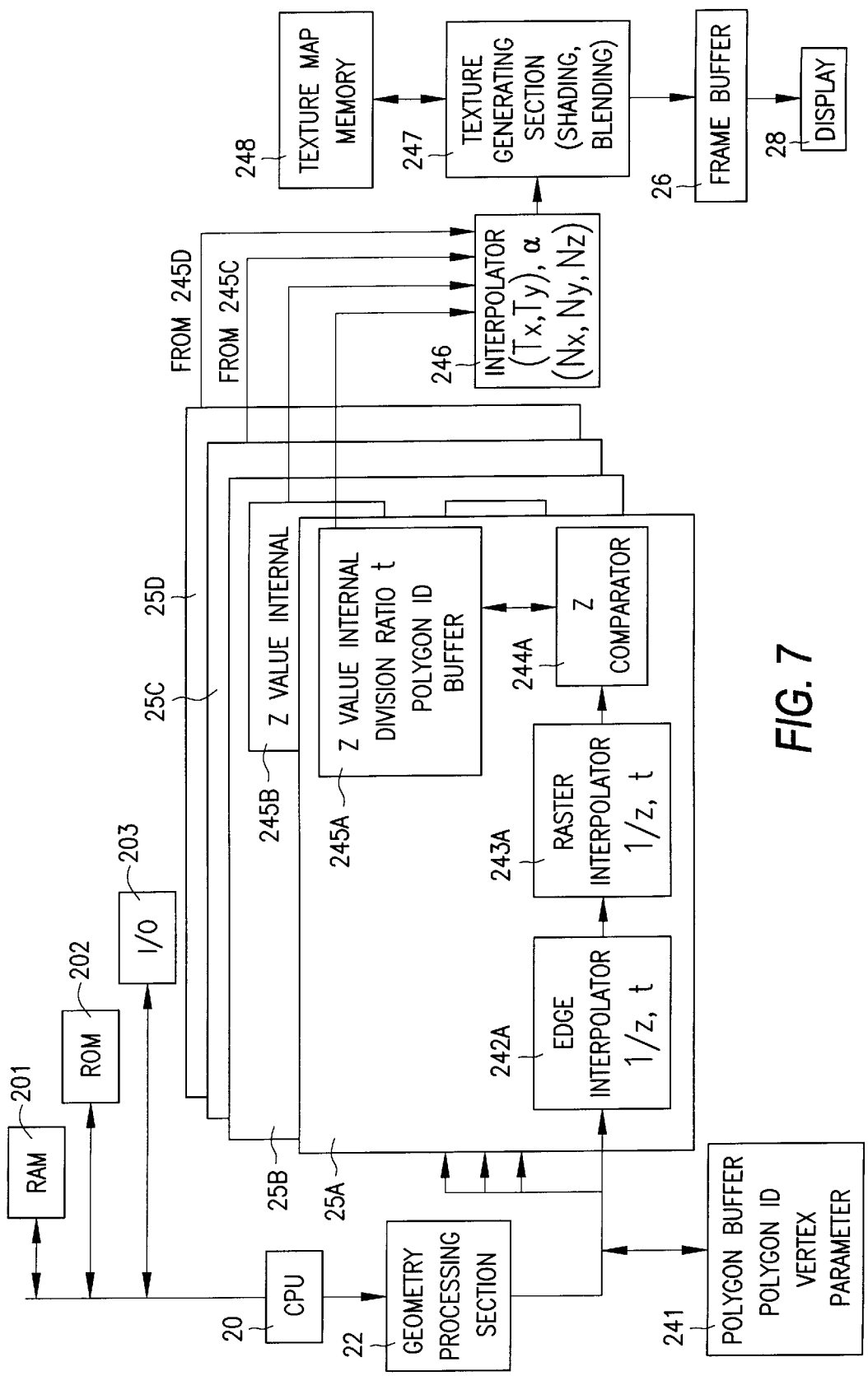
FIG. 7 is a block diagram showing a further compositional example of an image processing device according to the present invention.

FIG. 7 is a block diagram showing a further compositional example of an image processing device according to the present invention. Rather than a generic computer, this example involves hardware for processing by a pipeline system, as illustrated in FIG. 5.

In this example, a plurality of Z value and another data generating units 25 as illustrated in FIG. 4 are provided and Z value and another data stored in the Z value buffers are generated for a plurality of pixels in parallel. In concrete terms, four Z value and another data generating units 25A, 25B, 25C, 25D are provided in parallel, as shown in FIG. 7. Therefore, the Z value buffer memory is divided into four: 245A, 245B, 245C, 245D. The elements in the latter half of the rendering section, namely, the parameter interpolator 246, texture generating section 247, and the like, are provided singly, as in the example in FIG. 4.

Figure 8:
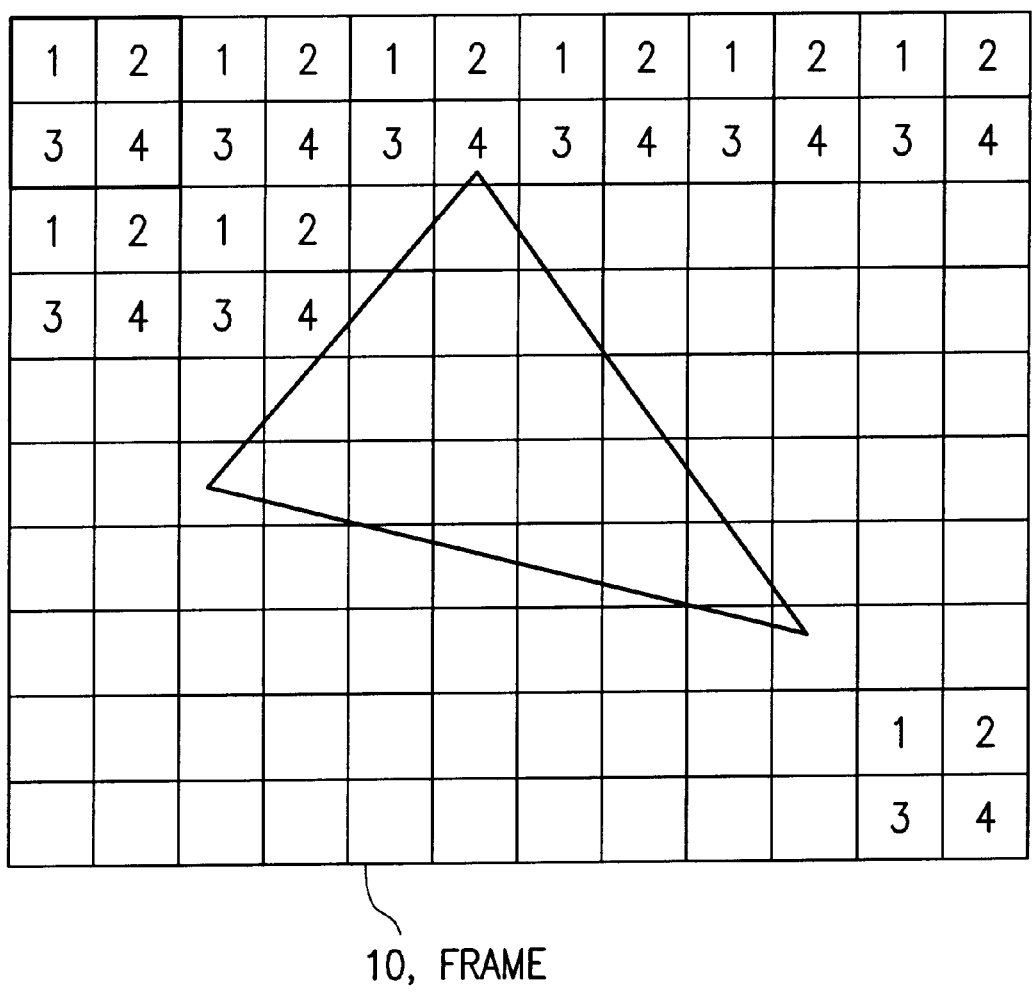
FIG. 8 is a diagram for describing an image processing method implemented by the image processing device in FIG. 7.
Figure 9:
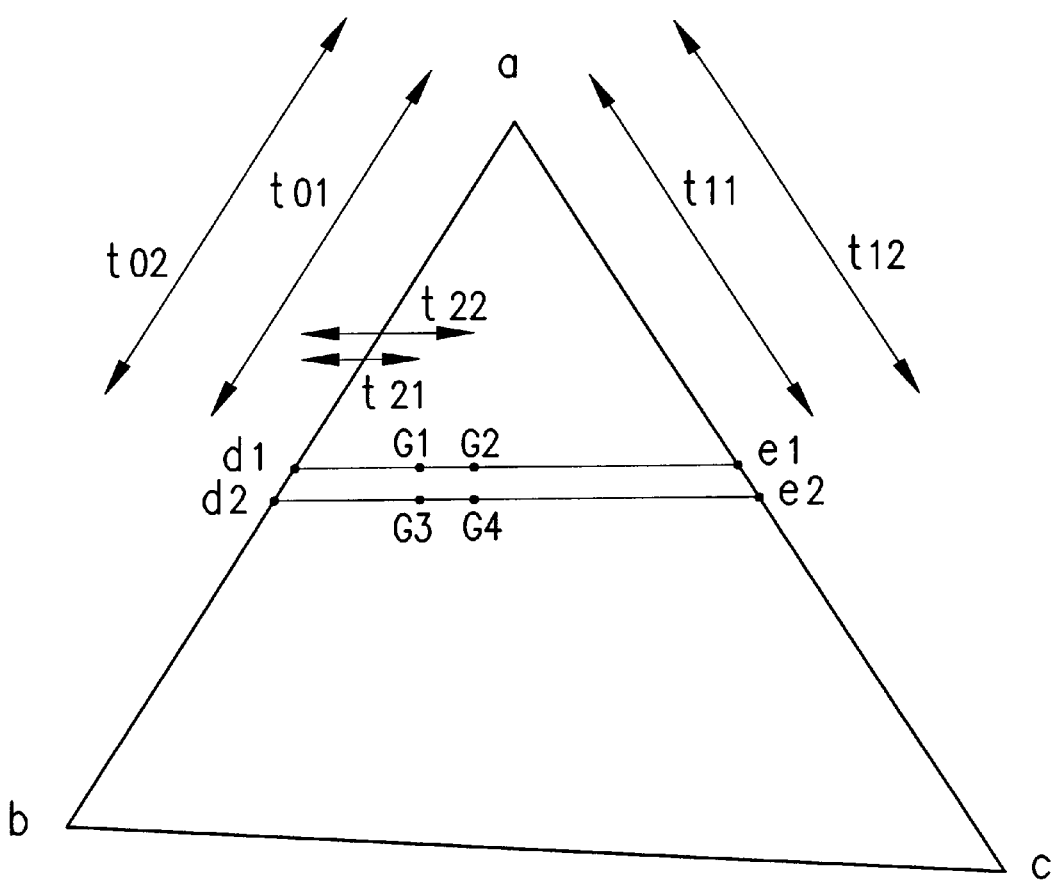
FIG. 9 is a diagram for describing an image processing method implemented by the image processing device in FIG. 7.

FIGS. 8 and 9 are diagrams for describing an image processing method implemented by the image processing device in FIG. 7. FIG. 8 illustrates the division of the Z value buffer memory into four parts. In this example, the pixels in the frame 10 are divided up as indicated by the numbers 1, 2, 3, 4 in the diagram. The Z value buffer memory 245A is provided for the pixels labelled with the number 1. Similarly, the Z value buffer memory 245B is provided for the number 2 pixels, and Z value buffer memories 245C, 245D are provided for the number 3 and 4 pixels. Therefore, each Z value buffer memory stores the Z values for one quarter of the image in the frame 10.

The processes of interpolating Z values and storing Z values, polygon ID data and internal division ratios for a particular polygon are conducted in parallel for the number 1–4 pixels. In other words, Z value interpolation processing is conducted for pixels G1, G2, G3, G4 by the four units in parallel. The edge interpolator 242A in unit 25A determines internal division ratios t01, t11 for pixel G1, and calculates the Z value at points d1, e1 on edges ab, ac by interpolation. The raster interpolator 243B determines the internal division ratio t22, and determines the Z value for the pixel G2 on the horizontal line d1e1. Therefore, since the edge interpolator conducts the same processing for pixels G1, G2, it is possible to integrate these processes. In the examples in FIGS. 8 and 9, since the pixel scanning is parallel to the Y axis, the same internal division ratios are simply used for both pixels G1 and G2 in the raster interpolator. Therefore, if the pixels G1, G2 are inclined with respect to the Y axis and scanning is conducted using a different algorithm, the internal division ratios of the edges will be different.

The Z value interpolation processing for pixels G3, G4 is similarly carried out by the units 25C and 25D respectively.

In the aforementioned parallel processing, only the steps S3 S7 in the flowchart illustrated in FIG. 5 are carried out in parallel. Therefore, when the processes of Z value interpolation and writing to the Z value buffer memory are completed for all the polygons in a frame, parameters for each pixel are interpolated using the polygon ID data and the internal division ratios stored in the four Z value buffer memories 245A, B, C, D, and colour data is generated using these parameters. Parameter interpolation is carried out by the interpolator 246 and colour generation processing is carried out by the texture generating section 247. This point is the same as the example in FIG. 4.

Figure 10:
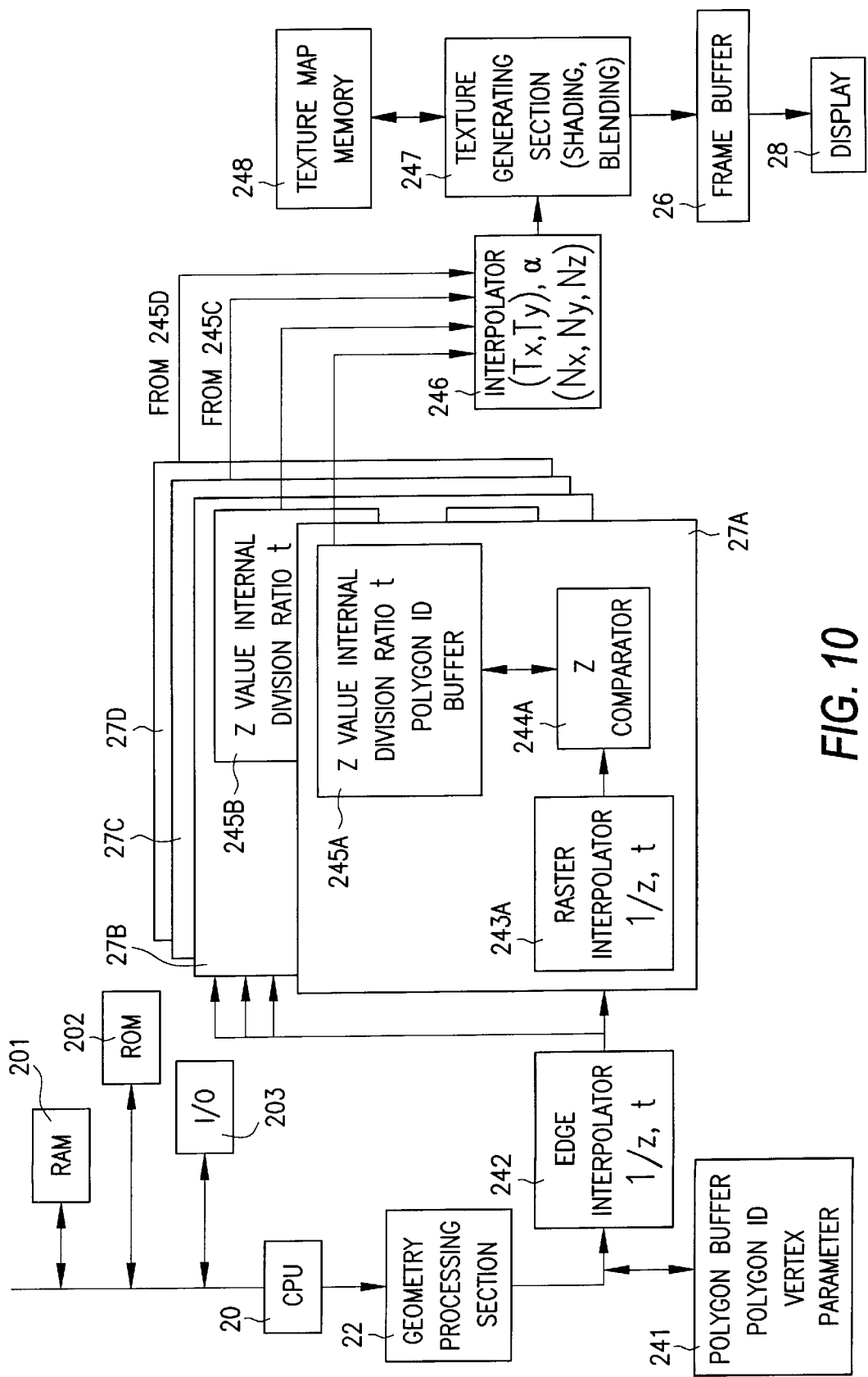
FIG. 10 is a block diagram showing a further compositional example of an image processing device according to the present invention.
Figure 11:
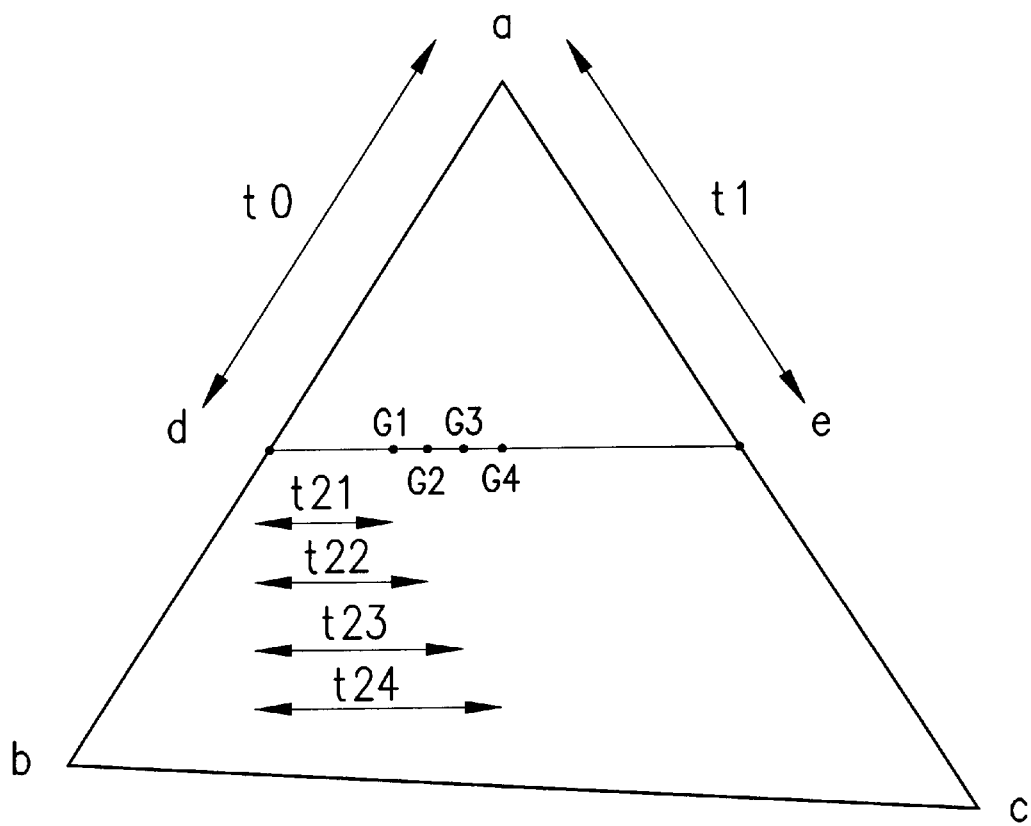
FIG. 11 is a diagram for describing the image processing method in FIG. 10.

FIG. 10 is a block diagram showing a further compositional example of the image processing device according to the present invention. FIG. 11 is a diagram for describing a corresponding image processing method. In this example, a common edge interpolator 242 is provided for four Z value generating units 27A, 27B, 27C, 27D. A raster interpolator 243A, Z value comparator 244A and Z value buffer memory 245A are provided respectively in each unit.

By referring to FIG. 11, it can be seen that a common edge interpolator 242 is used. As FIG. 11 shows, the four pixels G1, G2, G3, G4 processed in parallel are positioned adjacently on the same horizontal line de. Consequently, the calculation process in the edge interpolator is the same. Therefore, the edge interpolator 242 determines Z values for points d and e on the edges using the internal division ratios t0, t1. Thereupon, Z values are determined for each pixel G1, G2, G3, G4 by the four units 27A, B, C, D using the internal division ratios t21, t22, t23, t24.

By adopting the composition in FIG. 10, it is possible to reduce the hardware composition of the four units, and increases in costs due to duplication of the four units can be reduced to a minimum.

Figure 12:
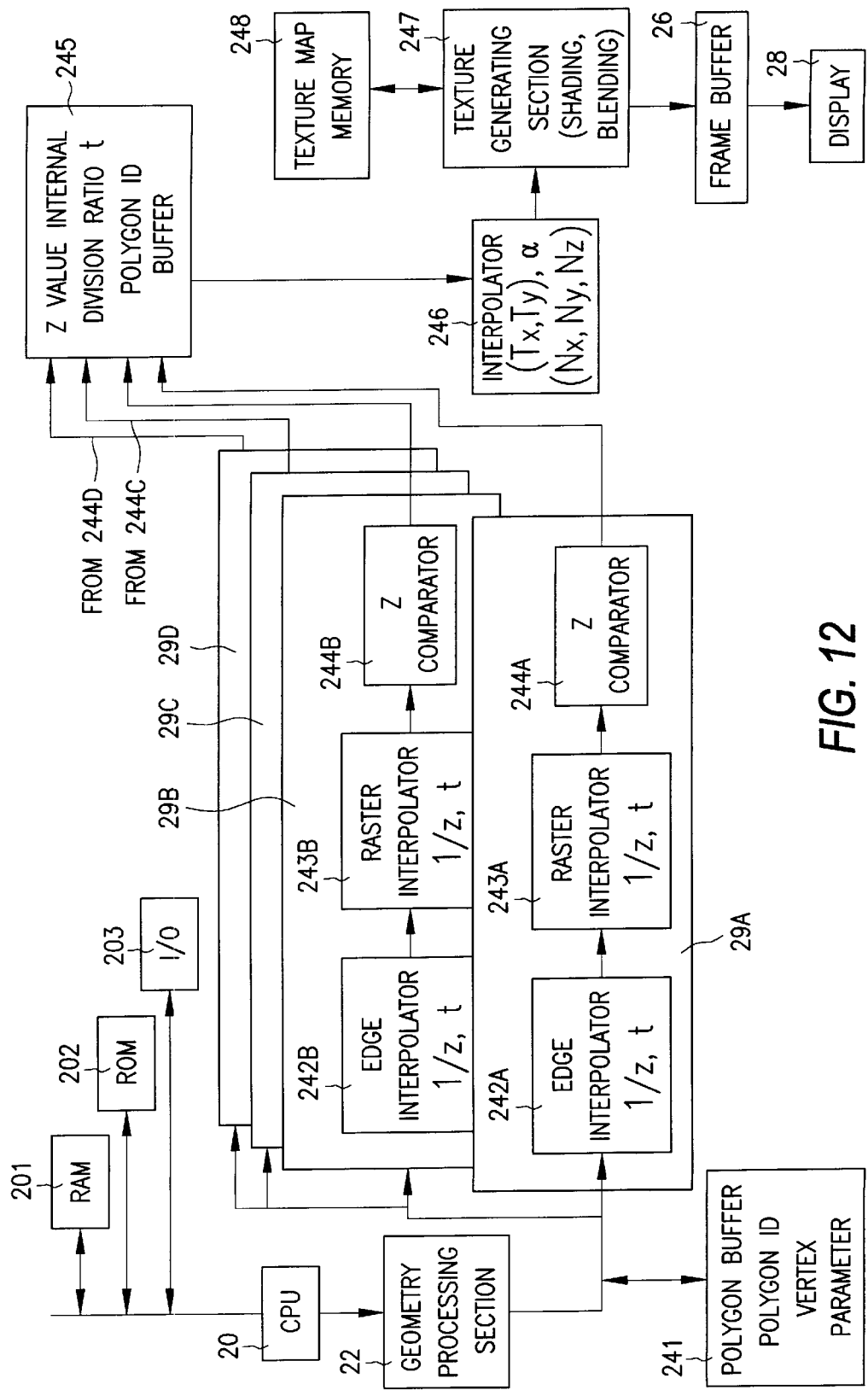
FIG. 12 is a block diagram showing a further compositional example of an image processing device according to the present invention.

FIG. 12 is a block diagram showing a further compositional example of an image processing device according to the present invention. This example shows a composition wherein Z value interpolation is carried out for a plurality of polygons in parallel. Therefore, a common Z value buffer memory 245 is provided for the Z value generating units 29A, B, C, D. Edge interpolators 242A–D, raster interpolators 243A–D and Z value comparators 244A–D are provided respectively in each unit. The respective units 29A–D carry out Z value interpolation in parallel for four polygons. Since the Z value buffer memory 245 is accessed jointly by each of the units, common access is implemented by allocating access times by means of time sharing, for example.

In a further compositional example, it is possible to adopt a structure for parallel processing of a plurality of polygons as in FIG. 12, wherein the internal composition of the units for each polygon allow parallel processing for a plurality of pixels, as illustrated in FIG. 7 and FIG. 10. Therefore, if four more of each of the units for each polygon are provided, the Z value buffer memory will also have to be divided into a plurality of sections, as shown in FIG. 7 and FIG. 10. The best combination is selected from the viewpoint of hardware size and processing efficiency.

The foregoing description of embodiments involved examples where scanning of the pixels in the polygon was carried out parallel to the X axis and Y axis. However, the present invention is not limited to this scanning algorithm. For example, it may also be applied by scanning in a direction inclined by a prescribed angle from the X axis and Y axis. It is also possible to scan pixels according to complex co-ordinates involving angle and length, for example. Furthermore, the present invention can also be applied by scanning based on an algorithm whereby the centre of a polygon is taken as a starting point and the polygon is divided into four quadrants, and then into a further four quadrants based on the centres of these quadrants.

In the foregoing example, positional co-ordinates data was described in the form of vertex screen co-ordinates (Sx, Sy) and Z values, but in a further example, global co-ordinates (x, y, z) might be used. This simply makes a difference in terms of whether perspective conversion is carried out before or after writing to the polygon buffer.

As described above, according to the present invention, rendering processes for determining colour data for pixels in a plurality of polygons can be carried out more efficiently. Specifically, the rendering section is divided into a first half section, where Z values are calculated by interpolation, Z values are compared by Z value interpolation and stored in a Z value buffer memory, and a second half section, where parameters are interpolated and colour data is generated using the polygon ID data in the Z value buffer memory. In the first half section, processing is conducted for all the polygons in a frame and the pixels to be displayed on the screen are confirmed. Thereupon, colour data is generated for these pixels. Therefore, it is possible to avoid purposeless generation of colour data in cases where there are overlapping polygons. Consequently, the overall efficiency of the rendering process is improved. Moreover, since the process of Z value interpolation is a simple operation compared to the generation of colour data, even if Z values are interpolated for overlapping polygons, this does not significantly reduce processing efficiency.

Furthermore, by providing a plurality of units of the first half of the hardware section, it is possible to generate Z values in parallel for a plurality of pixels or a plurality of polygons. Moreover, since the first half section and second half section are provided separately, the hardware composition in the first half section is small compared to the rendering section as a whole. Therefore, even if hardware is duplicated for the purpose of parallel processing, the hardware composition does not become particularly large in size.

What is claimed is:

1. An image processing device having a rendering processing section for generating colour data for pixels which are to be displayed from polygon data including, at least, a polygon ID, positional co-ordinates data and parameters for generating colour data attributed thereto, said image processing device comprising:

a polygon buffer memory for storing said polygon data; and a frame buffer memory for storing colour data for the pixels in a frame;

wherein said rendering processing section comprises:

a first processing section for generating Z values (depth values) indicating the depth in a screen of pixels in respective polygons, for a plurality of polygons located in said frame, and storing the Z values for pixels to be displayed on said screen and said polygon IDs corresponding thereto in a Z value buffer memory, in which the Z values for pixels in said frame are stored; and a second processing section for generating colour data from said parameters attributed to the polygon IDs stored in said Z value buffer memory, for each pixel in said frame;

wherein said colour data for each pixel generated by said second processing section is stored in said frame buffer memory, and said colour data for each pixel is generated by said second processing section after each of said plurality of polygons located in said frame has been processed by the first processing section.

2. The image processing device according to claim 1, wherein:

said first processing section comprises a Z value interpolator for calculating Z values for said pixels by interpolation on the basis of said positional co-ordinates data; and a Z value comparator for judging whether or not a pixel is positioned to the front in said screen, on the basis of a Z value determined by said Z value interpolator and a Z value in said Z value buffer memory.

3. The image processing device according to claim 2, wherein:

said Z value interpolator determines internal division ratios for said pixels used in said interpolator, and records said internal division ratios in said Z value buffer memory along with said Z values.

4. The image processing device according to claim 3, wherein:

said second processing section comprises a parameter interpolator for calculating parameter values for said pixels by interpolation on the basis of the parameters in said polygon data and the internal division ratios stored in said Z value buffer memory.

5. The image processing device according to claim 1, wherein:

said second processing section comprises a parameter interpolator for calculating parameter values for said pixels by interpolation on the basis of the parameters in said polygon data, and a colour data generating section for generating said colour data on the basis of the parameter values for said pixels generated by said parameter interpolator.

6. The image processing device according to claim 1, wherein:

said polygon parameters comprise, at least, texture co-ordinates, and said second processing section determines texture co-ordinates for said pixels by interpolating said texture co-ordinates, reads out texture data stored at the texture coordinates for the relevant pixel from a texture map which stores texture data for said polygons, and generates said colour data.

7. The image processing device according to claim 6, wherein:

said polygon parameters further comprise normal vectors, and said second processing section determines normal vectors for said pixels by interpolating said normal vectors, and conducts a shading operation with respect to said determined colour data in accordance with the relevant normal vectors.

8. The image processing device according to any of claims 1 to 7, wherein:

said polygon data comprises vertex IDs and said positional co-ordinates data and said parameters for vertices attributed thereto.

9. An image processing device having a rendering processing section for generating colour data for pixels which are to be displayed from polygon data including, at least, a polygon ID, positional co-ordinates data and parameters for generating colour data attributed thereto, said image processing device comprising:

a polygon buffer memory for storing said polygon data; and a frame buffer memory for storing colour data for the pixels in a frame;

wherein said rendering processing section comprises:

a plurality of first processing sections each for generating representative Z values (depth values) for representative sets of pixels, in parallel, indicating the depth in a screen of pixels in respective polygons, for a plurality of polygons located in said frame, and storing the Z values for pixels to be displayed on said screen and said polygon IDs corresponding thereto in a Z value buffer memory, in which the Z values for pixels in said frame are stored; and a second processing section for generating colour data from said parameters attributed to the polygon IDs stored in said Z value buffer memory, for each pixel in said frame; wherein said colour data for each pixel generated by said second processing section is stored in said frame buffer memory, wherein said second processing section generates colour data after each of said plurality of polygons located in said frame has been processed by the plurality of first processing sections.

10. The image processing device according to claim 9, wherein:

said plurality of first processing sections each further comprising: a Z value interpolator for calculating Z values for said pixels by interpolation on the basis of said positional co-ordinates data; and a Z value comparator for judging whether or not a pixel is positioned to the front of said screen, on the basis of a Z value determined by said Z value interpolator and a Z value in said Z value buffer memory, wherein the Z values for said pixels are generated for a plurality of pixels in parallel.

11. The image processing device according to claim 10, wherein:

said Z value interpolator comprises an edge interpolator for generating Z values at points on the edges of the polygon; and a raster interpolator for interpolating Z values for pixels between said edges in accordance with the Z values at the edges generated by said edge interpolator.

12. The image processing device according to claim 10, further comprising:

an edge interpolator provided jointly for the plurality of first processing sections.

13. The image processing device according to claim 9, wherein:

said first processing section comprises a Z value interpolator for interpolating Z values for pixels on the basis of said positional co-ordinates data; and a Z value comparator for judging whether or not a pixel is positioned to the front in said screen, on the basis of a Z value determined by said Z value interpolator and a Z value in said Z value buffer memory, wherein the Z values for said pixels in a relevant polygon are generated for a plurality of polygons in parallel.

14. An image processing method having a rendering process step for generating colour data for pixels which are to be displayed from polygon data including, at least, a polygon ID, positional co-ordinates data and parameters for generating colour data attributed thereto, said rendering process step comprising:

a first processing step for generating Z values (depth values) indicating the depth in a screen of pixels in respective polygons, for a plurality of polygon located in said frame, and storing the Z values for pixels to be displayed on said screen and said polygon IDs corresponding thereto in a Z value buffer memory, in which the Z values for pixels in said frame are stored; and a second processing step for generating colour data from said parameters attributed to the polygon IDs stored in said Z value buffer memory, for each pixel in said frame, and storing said generated colour data for each pixel in said frame buffer memory.

wherein said second processing step generates colour data after each of the plurality of polygons located in said frame has been processed by the first processing step.

15. The image processing method according to claim 14, wherein:

said first processing step comprises a Z value interpolating step for calculating Z values for said pixels by interpolation on the basis of said positional co-ordinates data; and a Z value comparing step for judging whether or not a pixel is positioned to the front in said screen on the basis of a Z value determined by said Z value interpolating step and a Z value in said Z value buffer memory.

16. The image processing method according to claim 15, wherein:

said Z value interpolating step further comprises a step for determining internal division ratios for said pixels used in said interpolation process and said first processing step further comprises a step for storing said internal division ratios with said Z values in said Z value buffer memory.

17. The image processing method according to claim 16, wherein:

said second processing step comprises a parameter interpolating step for calculating parameter values for said pixels by interpolation on the basis of the parameters in said polygon data and the internal division ratios stored in said Z value buffer memory.

18. The image processing method according to claim 14, wherein:

said second processing step comprises a parameter interpolating step for calculating parameter values for said pixels on the basis of the parameters in said polygon data; and a colour data generating step for generating said colour data on the basis of the parameter values for said pixels generated in said parameter interpolating step.

19. The image processing method according to claim 14, wherein:

said polygon parameters comprise, at least, texture co-ordinates; and said second processing step comprises a step for determining texture co-ordinates for said pixels by interpolating said texture co-ordinates, and generating said colour data by reading out texture data stored at the texture co-ordinates for a relevant pixel from a texture map which stores texture data for said polygons.

20. The image processing method according to claim 14, wherein:

said first processing step is implemented in parallel for a plurality of pixels.

21. The image processing method according to claim 14, wherein:

said first processing step is implemented in parallel for a plurality of polygons.

22. A computer-readable storage medium, storing a program for causing a computer, which comprises, at least, a central processing device for performing calculations and a frame buffer memory for storing colour data for pixels in a frame, to execute an image processing routine comprising a rendering process whereby colour data for pixels which are to be displayed is generated from polygon data including, at least, a polygon ID, positional coordinates data and parameters for generating color data attributed thereto, wherein said programs comprise a program for causing a computer to execute:

a first processing routine for generating Z values (depth values) indicating the depth in a screen of pixels in respective polygons, for a plurality of polygons located in a frame, and storing the Z values for pixels to be displayed on said screen and said polygon IDs corresponding thereto in a Z value buffer memory, in which the Z values for pixels in said frame are stored; and a second processing routine for generating colour data from said parameters attributed to the polygon IDs stored in said Z value buffer memory, for each pixel in said frame buffer memory, wherein said second processing routine generates colour data after each of the plurality of polygons located in said frame has been processed by the first processing routine.

23. The storage medium according to claim 22, wherein:

said first processing routine comprises a Z value interpolating routine for calculating Z values for said pixels by interpolation on the basis of said positional co-ordinates data; and a Z value comparing routine for judging whether or not a pixel is positioned to the front in said screen on the basis of a Z value determined by said Z value interpolating routine and a Z value in said Z value buffer memory.

24. The storage medium according to claim 23, wherein:

said Z value interpolating routine further comprises a routine for determining internal division ratios for said pixels used in said interpolation process and said first processing routine further comprises a routine for storing said internal division ratios with said Z values in said Z value buffer memory.

25. The storage medium according to claim 24, wherein:

said second processing routine comprises a parameter interpolating routine for calculating parameter values for said pixels by interpolation on the basis of the parameters in said polygon data and the internal division ratios stored in said Z value buffer memory.

26. The image processing method according to claim 22, wherein:

said second processing routine comprises a parameter interpolating routine for calculating parameter values for said pixels on the basis of the parameters in said polygon data; and a colour data generating routine for generating said colour data on the basis of the parameter values for said pixels generated in said parameter interpolating routine.

27. The storage medium according to claim 22, wherein:

said polygon parameters comprise, at least, texture co-ordinates, and said second processing routine comprises a routine for determining texture co-ordinates for said pixels by interpolating said texture co-ordinates, and generating said colour data by reading out texture data stored at the texture co-ordinates for a relevant pixel from a texture map which stores texture data for said polygons.

28. The storage medium according to claim 22, wherein:

said first processing routine is implemented in parallel for a plurality of pixels.

29. The storage medium according to claim 22, wherein:

said first processing routine is implemented in parallel for a plurality of polygons.

30. The image processing device according to claim 12, wherein:

said Z value interpolator comprises a raster interpolator for interpolating Z values for pixels between said edges in accordance with the Z values at the edges generated by said edge interpolator.

* * * * *